(No Model.) 2 Sheets—Sheet 1.
J. LOSEY.
GATE.
No. 504,392. Patented Sept. 5, 1893.
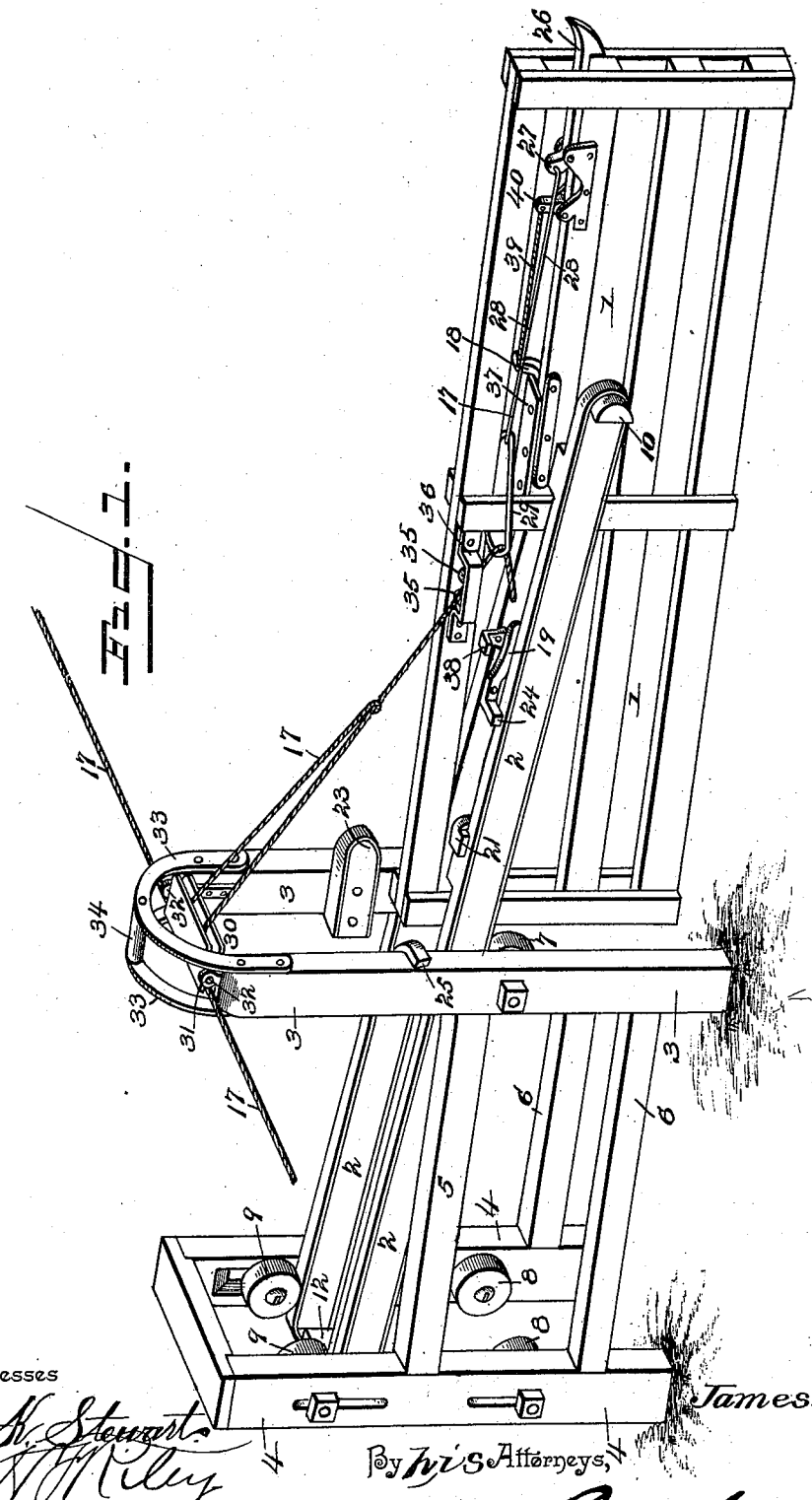
Witnesses
E. K. Stewart
N. T. Riley
Inventor
James Losey
By his Attorneys,
C. A. Snow & Co.

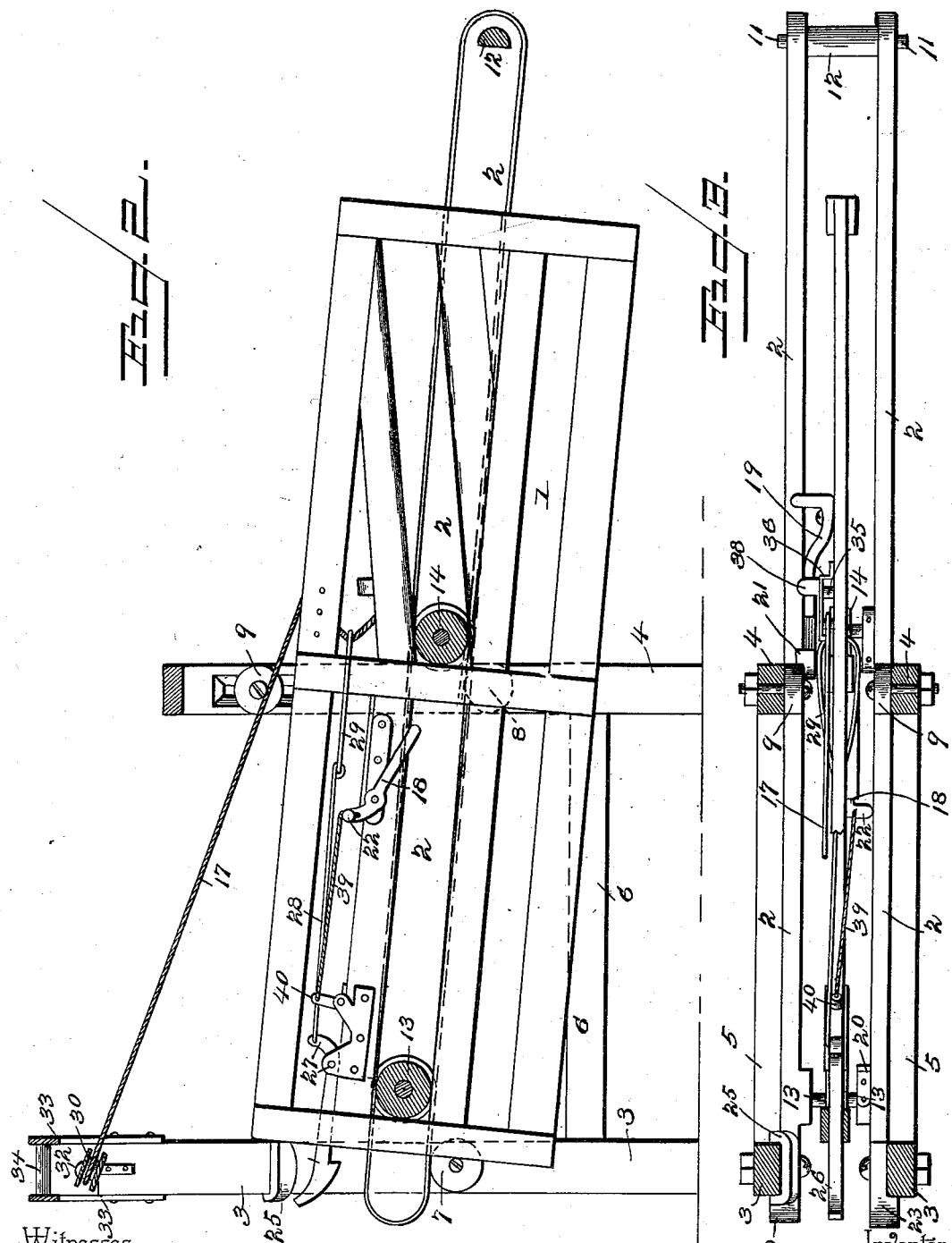

UNITED STATES PATENT OFFICE.

JAMES LOSEY, OF FREEPORT, MICHIGAN, ASSIGNOR OF TWO-THIRDS TO EDWIN W. BATTLES AND OSCAR E. JENNINGS, OF SAME PLACE.

GATE.

SPECIFICATION forming part of Letters Patent No. 504,392, dated September 5, 1893.

Application filed March 7, 1893. Serial No. 465,057. (No model.)

*To all whom it may concern:*

Be it known that I, JAMES LOSEY, a citizen of the United States, residing at Freeport, in the county of Barry and State of Michigan, have invented a new and useful Gate, of which the following is a specification.

The invention relates to improvements in sliding gates.

The object of the present invention is to simplify, improve and increase the efficiency of sliding gates, and to enable them to be readily opened and closed in a positive and reliable manner.

The invention consists in the construction and novel combination and arrangement of parts hereinafter fully described, illustrated in the accompanying drawings and pointed out in the claims hereto appended.

In the drawings—Figure 1 is a perspective view of a sliding gate constructed in accordance with this invention. Fig. 2 is a vertical longitudinal sectional view, the gate being open. Fig. 3 is a plan view partly in section.

Like numerals of reference indicate corresponding parts in all the figures of the drawings.

1 designates a sliding gate mounted on a sliding and tilting frame 2, which is supported by a frame composed of parallel uprights 3 and 4 and horizontal connecting bars 5 and 6. The sliding and tilting frame 2 is mounted upon pairs of rollers 7 and 8, the former of which serve as a fulcrum for the frame 2; and when the sliding and tilting frame is moved forward, when the gate is being closed, the upward tilting of the rear end of the frame 2 is limited by rollers 9. The rollers 8 and 9 of the uprights 4 are vertically adjustable to regulate the tilting of the frame 2.

The sliding and tilting frame 2 is provided at each end with laterally extending stops 10 and 11, and is composed of similar side-bars spaced at the rear end of the frame by a block 12, and at the front and an intermediate point near the center by spindles of rollers 13 and 14.

The sliding gate 1 is provided with a longitudinal opening or way to receive the rollers 13 and 14; and the rear portion of said way is upwardly inclined from the middle of the gate to the rear end thereof. In opening and closing, the gate at the beginning of the movement moves with the sliding and tilting frame until the latter has assumed an inclined position in one direction or the other, and the gravity of the gate causes it to complete the opening or closing, the inclined frame 2 forming a way on which the gate slides.

A draft rope 17 actuates the gate which is provided with oppositely disposed pivoted gravity latches 18 and 19, arranged to engage lugs 20 and 21 of the sliding and tilting frame 2. The lug 20 is arranged at one side and near the front of the sliding and tilting frame 2, and is adapted to be engaged when the gate is being opened by the latch 18, which inclines from front to rear, whereby when the draft rope 17, which is connected to the gate near the middle thereof, is pulled, both the gate and the sliding and tilting frame will be moved rearward. The gate and the sliding frame thus actuated move rearward until the front stops 10 of the sliding frame strike the uprights 3, at which time the frame 2 will be inclined rearward, and the front end of the latch 18, which is provided with a lateral projection 22, will engage a trip 23 in order to become disengaged from the lug 20 to permit the gate to continue its rearward movement and complete the opening.

The trip 23 consists of a block or piece having a lower face or edge inclining downward from front to rear to engage the lateral projection at the front edge of the latch to depress the projection 22 and lift the rear end of the latch out of engagement with the latch 20.

The operation of the gate in closing is substantially the same as it is in opening, with the exception that the latch 19 inclines from rear to front and is provided at its rear end with a lateral projection 24 to engage a trip 25, which has its lower edge or face inclined from rear to front to release the gate from the lug 21 when the sliding frame has assumed a forwardly inclined position.

The front of the gate is provided with a latch 26 to engage a suitable keeper of a latch post; the latch is pivoted near its rear end 27, which is bent upward; and the upward bent end 27 is connected by a wire 28 with the draft rope. The wire 28 is provided at its rear end with a loop 29 which receives a draft rope, and when the latter is drawn in opening the gate the latch is pulled rearward to lift it out of engagement with its keeper (not shown). The draft rope extends to a pulley block 30 and is designed to have suitable connections by means of which the gate may be operated from either side at a suitable distance from it to enable the gate to be operated without necessitating dismounting or leaving a vehicle.

The pulley block 30 has two pulleys, between which the draft rope passes, and it is provided at its ends with journals 31 arranged in bearing eyes 32 at the top of the uprights 3. By journaling the pulley block it will readily turn to conform to the movement of the gate to prevent the draft rope from binding. The upper ends of the uprights 3 are connected by an arched frame 33, composed of inclined sides having their lower ends secured to the uprights, and their upper ends connected by a rounded crosspiece 34. The lower end of the draft rope, which is attached to the gate, passes between opposite pulleys 35 of a casing 36 secured to the top rail of the gate.

The gate is provided with guards 37 and 38 to limit the upward movement of the lug-engaging ends of the latches 18 and 19. The lateral projection 22 is connected by a cord 39 with a bell-crank lever 40, which is mounted on the gate and arranged near the front end thereof slightly in rear of the latch 26 to enable the latch 18 to be readily disengaged when it is desired to open the gate partially, to permit the passage of a person on foot.

It will be seen that the sliding gate is simple and comparatively inexpensive in construction, that it is positive and reliable in operation, and that it may be partially opened with great convenience.

Changes in the form, proportion and the minor details of construction may be resorted to without departing from the principle or sacrificing any of the advantages of this invention.

What I claim is—

1. The combination of a supporting frame provided with rollers, a sliding and tilting frame provided with lugs arranged at its front and at the center, a sliding gate mounted on the sliding and tilting frame, latches arranged on the gate and adapted to engage the lugs alternately and trips mounted on the supporting frame for releasing the latches from their engagement, substantially as and for the purpose described.

2. The combination of a supporting frame provided with rollers, a sliding and tilting frame having rollers and provided with lugs located at the front end of the frame and adjacent to the center, a sliding gate mounted on the sliding and tilting frame, the oppositely inclined latches pivotally mounted on the gate and arranged to engage said lugs and provided at their upper ends with projections, and the trips mounted on the supporting frame and having oppositely inclined faces arranged to engage the projections of said latches, substantially as described.

3. The combination of a supporting frame provided with rollers, a sliding and tilting frame mounted on the rollers and provided at the front and at an intermediate point with lugs and having rollers, oppositely disposed latches mounted on the gate and arranged to engage said lugs, trips mounted on the supporting frame for disengaging the latches, and a lever mounted on the front of the gate and connected with the latch which engages the front lug, substantially as described.

In testimony that I claim the foregoing as my own I have hereto affixed my signature in the presence of two witnesses.

JAMES LOSEY.

Witnesses:
AARON BARRETT,
THOMAS SULLIVAN.